No. 681,159. Patented Aug. 20, 1901.
A. G. WATERHOUSE & J. S. FORBES.
APPARATUS FOR HEATING AND STERILIZING FLUIDS.
(Application filed Feb. 24, 1900.)

(No Model.)

Witnesses:—

Inventors:—
Addison G. Waterhouse
John S. Forbes.
by their Attorneys:—

UNITED STATES PATENT OFFICE.

ADDISON G. WATERHOUSE AND JOHN S. FORBES, OF PHILADELPHIA, PENNSYLVANIA, ASSIGNORS TO SAID FORBES.

APPARATUS FOR HEATING AND STERILIZING FLUIDS.

SPECIFICATION forming part of Letters Patent No. 681,159, dated August 20, 1901.

Application filed February 24, 1900. Serial No. 6,381. (No model.)

*To all whom it may concern:*

Be it known that we, ADDISON G. WATERHOUSE and JOHN S. FORBES, citizens of the United States, and residents of Philadelphia, Pennsylvania, have invented certain Improvements in Apparatus for Heating and Sterilizing Fluids, of which the following is a specification.

Our invention relates to the art of heating water and other fluids for the purpose of destroying disease germs and also for producing chemical effects and other useful purposes in the arts, and more particularly relates to that class of fluid-heaters wherein the fluid is made to pass through the apparatus without being transformed into vapor by being gradually raised to a higher temperature and then reduced to its normal temperature by having the heat transferred from the outflowing to the inflowing fluid passing through the apparatus.

The object of our invention is to construct an apparatus of the class referred to which will be applicable to plants of large capacity for city supply, having its separate parts detachable and made in separate units, so that the means employed for furnishing the heat required can be produced at a single furnace and distributed economically to the various units comprising the entire apparatus.

In order to fully set forth our invention, reference will be had to the accompanying drawings, made a part hereof, in which—

Figure 1:
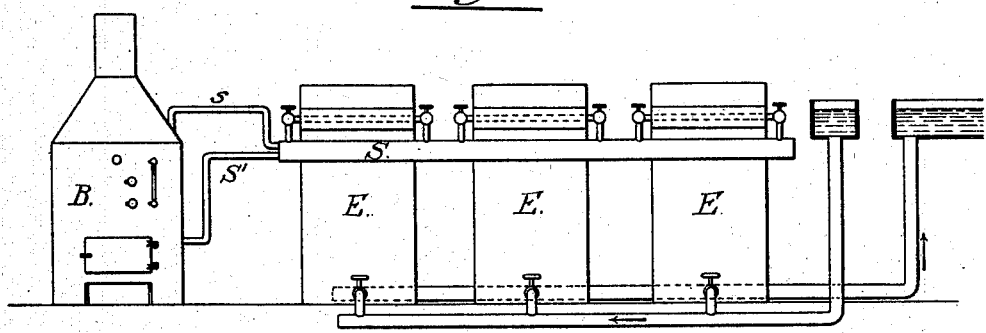
Figure 2:
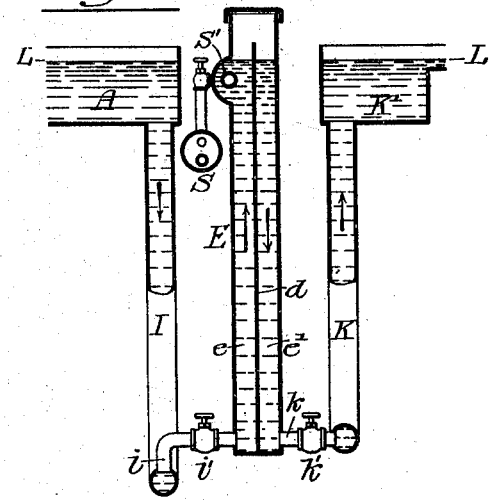
Figure 3:
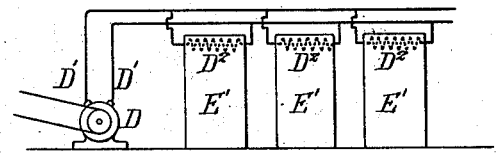

Figure 1 shows diagrammatically a system with parts arranged according to our invention. Fig. 2 is a sectional view of one of the heat-exchanges. Fig. 3 shows a means of employing electricity for heating.

Referring to Fig. 1, B is a boiler for generating steam.

E E E are a series of heat-exchanges. Each exchange is divided into two compartments $e$ $e'$ by a partition $d$, which forms a weir at its upper end, so that the water will flow from one compartment into the other. The heat of the water after it has been raised to its highest temperature and as it is passing down the compartment $e'$ is transferred to the incoming cold water or other fluid, so that the outgoing fluid is cooled while the incoming fluid is heated to a certain degree.

S is a steam-circulating pipe connected to the upper part of the boiler by a pipe $s$ and to the lower part of the boiler by a pipe $s'$.

S' represents steam-pipes connected to the circulating-pipe S. Each steam-pipe S' passes through the upper part of the chamber $e$ of each heat-exchange E, as shown in Figs. 1 and 2. Valves are provided by cutting out any one or all of the heat-exchanges, if necessary.

I is the supply-pipe for water or other fluid, connected to the lower part of the compartment $e$ of the heat-exchange by a pipe $i$, having a valve $i'$.

K is the main return-pipe, connected to the lower part of the compartment $e'$ of each heat-exchange by a pipe $k$, having a valve $k'$.

In operation the fluid to be treated starts from the tank or reservoir A, which has a water-level constantly maintained at the line represented by L, so that the fluid is free to pass from A down pipe I and fill the compartment $e$ of the heat-exchange E up to the water-line L, where it is stopped by gravitation from rising any higher or flowing over the partition $d$. If at this point steam at a pressure above atmosphere is passed through the pipe which is surrounded by the water or fluid in $e$, it will cause such fluid to boil or come to a state of ebullition, which would raise its surface in the form of froth at a higher level than L and cause it to flow over the top of the partition $d$ and pass down the compartment $e'$ in a heated condition. The hot fluid flowing in $e'$ must fill this compartment before it can rise to the level of the discharge K'. Therefore the heat from the fluid in $e'$ will pass by conduction through the partition $d$ into the cold fluid entering at $e$, so by the time the hot fluid in $e'$ sinks to the bottom of $e'$ it will have given up its heat to the fluid passing up into $e$, so that the cold fluid passing in $e$ reaches the top hot, while the hot fluid flowing over into $e'$ passes out at K' cold. Therefore the same heat is used over and over again, and but a small amount of applied heat is required to operate the apparatus.

The heat employed is applied within the heat-exchange without having to conduct the fluid to and from separate heaters, so that this heat can be generated in large quantities by a single generator, which makes it practicable to operate an unlimited number of heaters and heat-exchanges.

Our present invention is not confined to operating the apparatus by causing the state of ebullition which is incidental to the boiling-point, as described in Letters Patent No. 615,932 and in subsequent applications filed in the Patent Office, but is applicable to cases wherein the expansive effect of any degree of heat is raised regardless of the boiling-point or either directly or indirectly applied to the fluid under treatment for causing the fluid to pass through the apparatus.

Fig. 3 shows a series of heat-exchanges E' E', into which heat is imparted by means of an electric current (represented by the dynamo D, conductors D', and the resistances $D^2$, placed within each heat-exchange) in place of the steam-pipe S, as shown in Fig. 2. These electrical resistances can be arranged in multiple, as shown, or in series by being provided with suitable shunts and switches for cutting the current on and off.

We claim as our invention—

1. The process of sterilizing fluids whereby the fluid under treatment has its temperature first gradually raised in a heat-exchange by heat supplied to it from outflowing hot fluid, the said temperature being finally brought, by means of heat-conductors within the said exchange placed near the surface of the fluid, to a point at which the said fluid will be caused to expand sufficiently to cause it to flow over a weir in said heat-exchange placed at a height above the level of the source of fluid-supply, substantially as described.

2. The method of imparting heat to a fluid, the same consisting in subjecting it to preliminary heating within a heat-exchange and then further raising its temperature by conducting heat therethrough at a point near the normal level of the fluid and below the level of its source of supply, substantially as described.

3. The process of sterilizing fluids whereby, after a portion of fluid has been gradually heated to a certain point, the said fluid is further heated to a degree sufficient to destroy germ life and to cause it to flow over a weir by heat supplied from heat-conductors extending through the fluid at a point near the surface of said fluid, substantially as described.

4. The process of sterilizing fluid, the same consisting in gradually heating said fluid to a certain extent in one compartment of a heat-exchange, supplying further heat from conductors placed within and just below the normal surface of the fluid thereby causing said fluid to enter the second compartment of the said exchange, and cooling the sterilized fluid.

In testimony whereof we have signed our names to this specification in the presence of two subscribing witnesses.

ADDISON G. WATERHOUSE.
JOHN S. FORBES.

Witnesses:
ROBERT W. LLOYD,
CHARLES SANDERSON.